March 28, 1967 G. A. SWANSON 3,310,984
AUTOMATIC PLANKTON SAMPLING SYSTEM
Filed Nov. 17, 1964 2 Sheets-Sheet 1

INVENTOR
GEORGE A. SWANSON
BY Ernest F. Cohen
Gersten Sadowsky
ATTORNEYS

March 28, 1967  G. A. SWANSON  3,310,984
AUTOMATIC PLANKTON SAMPLING SYSTEM
Filed Nov. 17, 1964  2 Sheets-Sheet 2

INVENTOR
GEORGE A. SWANSON
BY Ernest S. Cohen
Gersten Sadowsky
ATTORNEY

United States Patent Office 3,310,984
Patented Mar. 28, 1967

3,310,984
AUTOMATIC PLANKTON SAMPLING SYSTEM
George A. Swanson, Yankton, S. Dak., assignor to the United States of America as represented by the Secretary of the Interior
Filed Nov. 17, 1964, Ser. No. 411,948
7 Claims. (Cl. 73—421)

ABSTRACT OF THE DISCLOSURE

An automatic system to obtain samples of plankton in water has a cylindrical tank whose bottom is an inverted conical casing containing in a nested arrangement a multiplicity of mesh screens of sizes ranging from fine to coarse openings. Solenoid actuated valves which function to determine operation of the system are controlled in electrical circuits by a tank overflow float switch, and timer mechanisms which at regular intervals open and close contacts in the circuits, whereby samples of water are periodically directed to enter the tank into which are released measured amounts of preservative, and during subsequent sampling cycles screened samples treated with preservative are deposited in a collection vessel.

---

The invention herein described and claimed may be manufactured and used by or for the Government of the United States of America for governmental purposes without the payment of royalties thereon or therefor.

This invention relates to a substance classifying system having an automatic sampling mechanism. The system can remain operative without attention over an extended period of time wherein it categorically separates substances by selectively screening them from a stream of fluid. In the particular embodiment described herein, the system is applied to withdraw samples of plankton from the water they inhabit, and to preserve the plankton whereby they remain in proper condition for analysis.

Because plankton constitute a most important source of food for fish, fluctuations in the production of plankton in a body of water have a direct bearing on fish production in that water. Identification of plankton as to genus, and data as to their population distribution have in the past been secured by a number of sampling techniques using manually manipulated screen and netting arrangements that required the constant attention of operating personnel. Consequently, programs having requirements for comprehensive dependable information concerning the availability and character of plankton in fishing waters employed considerable manpower, and were costly. The present invention allows even the most extensive needs for plankton data to be effectively and economically satisfied. After installation, the system according to the invention operates on a continuing basis, over a relatively long period of time, to automatically collect samples of plankton at predetermined times during its operation.

An object of the present invention is to provide an apparatus for automatically taking samples of plankton from a stream of water.

Another object of the invention is to provide a time controlled arrangement in which screening devices are effective, at predetermined intervals over an extended period of time, to selectively separate samples of plankton from a stream of water, and suitably preserve the plankton for subsequent analysis and study.

Figure 1:
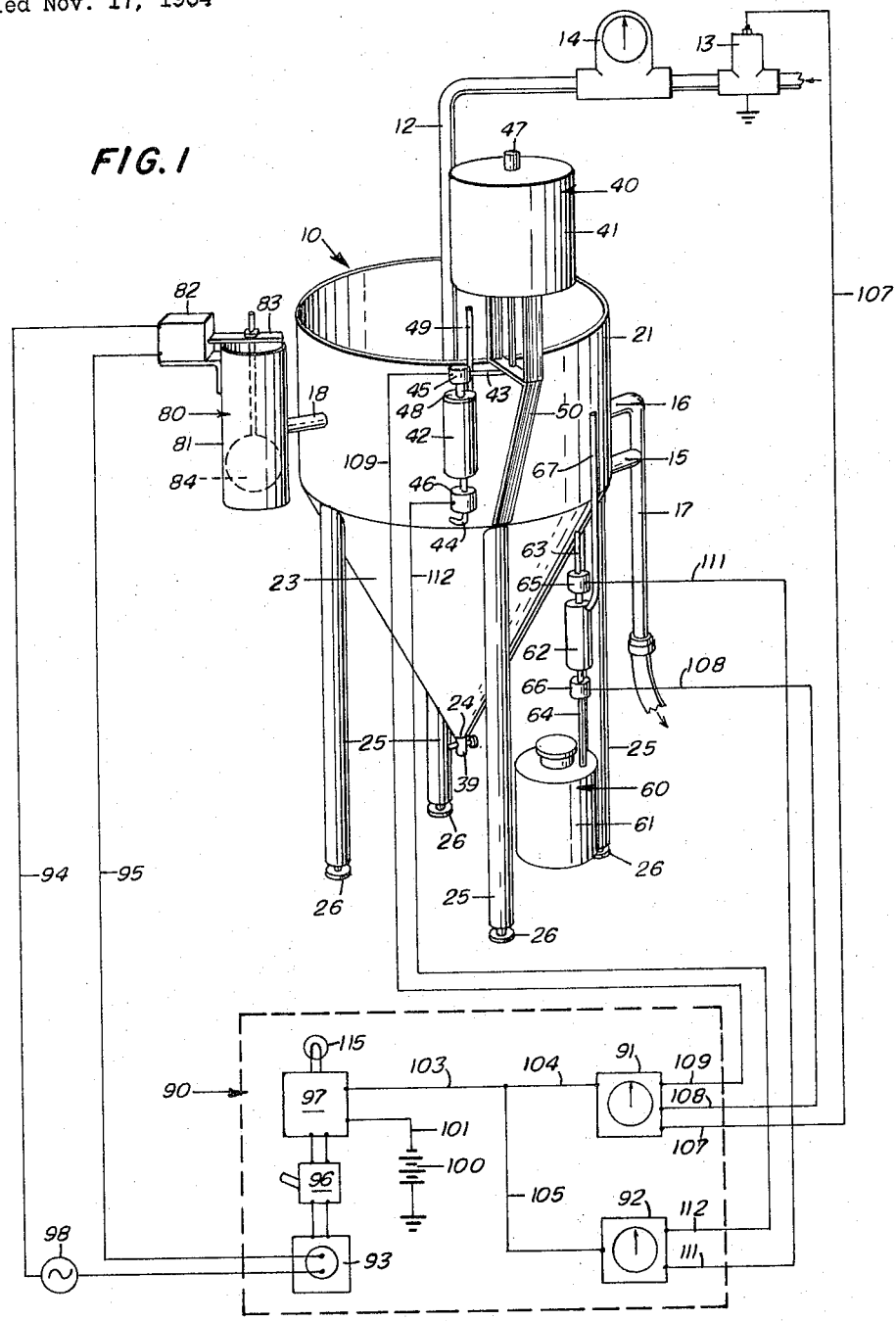
Figure 2:
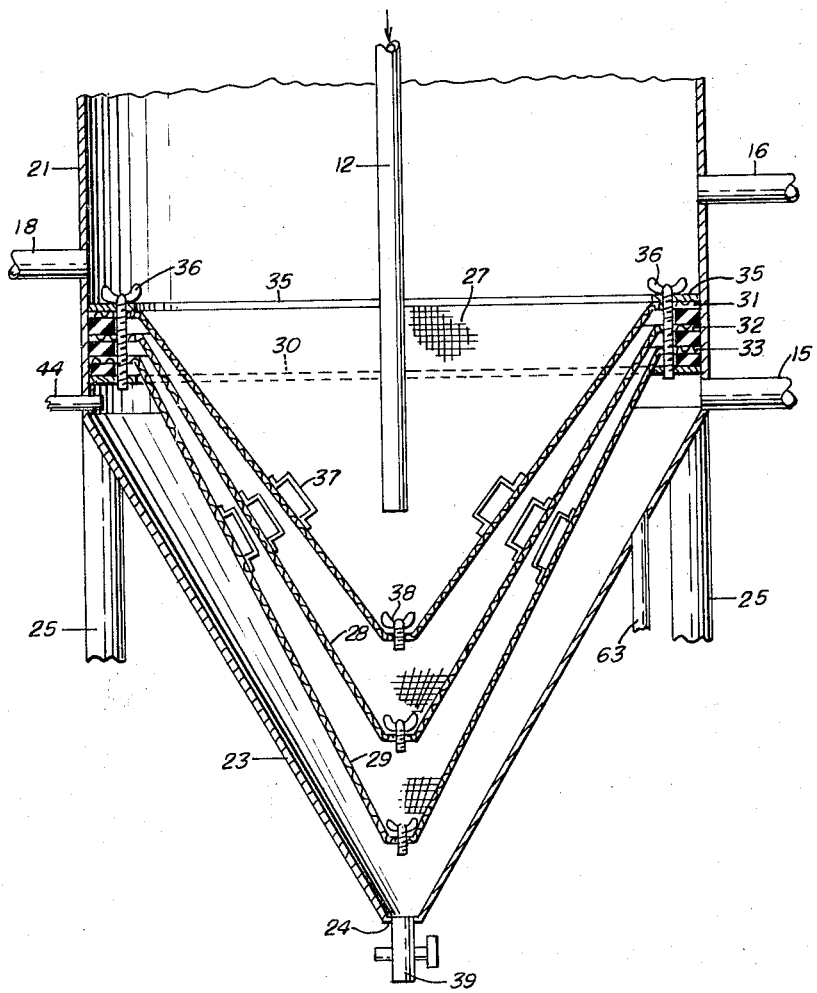

These and other objects of the invention will be more clearly understood from the following description of a preferred embodiment of the invention, considered together with the accompanying drawing wherein:

FIG. 1 is a partly diagrammatic and partly schematic view of the over-all system according to the present invention, illustrating the more comprehensive parts of the invention, and the elements cooperatively relating such parts; and FIG. 2 is a partial cross-sectional, schematic view of structure shown in FIG. 1, including an arrangement of screens which are effective therein to screen the plankton from a stream of water passing therethrough.

Comprehended within the present invention as shown in FIG. 1 are a number of operatively interrelated inclusive structural components which form its system, including a screening tank 10, a preservative unit 40, a water sampling unit 60, an overflow control unit 80, and a control panel 90. Water to be examined for its plankton content is received in the system of FIG. 1 from a source such as a stream diverted from a reservoir, or cooling passage of a powerhouse turbine. This water is delivered through an input feed conduit 12, downwardly extending into tank 10, and having operatively associated therewith a solenoid actuated intake valve 13, and a meter 14 measuring the volume of water passed through valve 13. Water processed through the system is normally discharged therefrom through outlet conduit 15. An emergency outlet conduit 16, spaced above conduit 15, provides a passage between the upper part of tank 10 and a downwardly extending drain pipe and hose 17, to which conduit 15 is also joined. Diametrically opposite conduit 16, and a short distance below the level thereof, is a further outlet conduit 18 through which water rising in tank 10 can pass into overflow control unit 80.

With reference to FIGS. 1 and 2, tank 10 is seen to comprise an integral structure having a relatively large diameter cylindrical shell or casing 21, extending upwardly from a funnel-like enclosure 23. Commonly aligned with the coincidental axes of the casing and enclosure are inlet conduit 12, and an outlet opening 24 in the lowest part of the enclosure. The unitary body of tank 10 is supported on a plurality of pipe legs 25, equipped with conventional leveling pads 26. As shown in FIG. 2, enclosure 23 is seen to house three downwardly disposed, conically shaped screens 27, 28 and 29, having circular upper openings of substantially the same diameter, and progressively increasing depths wherein the deepest screen 29 is generally concentric with the contour of the enclosure. These screens are supported in operative position on a flat band ring 30 secured to the inner wall of casing 21, adjacent its lower rim. On the circular ledge defined by the upper surface of ring 30 are received hoop-like stainless steel rims 31, 32 and 33, providing three circular openings from which are dependent screens 27, 28 and 29, respectively, rubber gaskets interspersed between the rims, and finally a further flat band ring 35, placed over the aforesaid parts stacked on ring 30. A plurality of thumb screws 36, received in suitable openings spaced around ring 35, screw onto threaded rods attached to and extending up from ring 30, to render ring 35 a pressure plate securing the screens in their operative positions, and sealing their rims to the inner surface of tank 10.

From the construction heretofore described, it is seen that the screening surfaces form three axially aligned pockets, one above the other. In a small opening at the lowest point in each pocket is fitted a thumb screw closure 38. After an operational run of the system, to be hereinafter more fully explained, the screens are taken out of tank 10 and their screw closures 38 are withdrawn to facilitate removal of accumulated strained material from the screens. Attached at suitably separated locations of the screening surfaces are ordinary pull handles 37 which are adapted to facilitate placement and removal of the screens in tank 10. In addition, bottom opening 24 of the enclosure is equipped with a drain cock 39.

Referring again to FIG. 1, it is seen that preservative unit 40 comprises a storage vessel 41 having a vented cap 47, a measuring receptacle 42, and tubular conduits 43 and 44, through which preservation is fed from vessel 41 to receptacle 42, and from the receptacle to tank 10, respectively. As can be best seen in FIG. 2, conduit 44 enters tank 10 immediately below support ring 30, in the cavity formed between the bottom screen 29 and enclosure 23. Solenoid operated valves 45 and 46 in conduits 43 and 44, respectively, are actuated by their solenoids to control the flow of a measured quantity of preservative into tank 10 at the completion of each sampling period. A vented cap 48, having a tubular air vent 49, is effective on receptacle 42 in an obvious manner. Storage vessel 41 is maintained in position above the upper rim of tank 10, by a frame brace 50 fixed in position on the outer wall of casing 21.

Water sampling unit 60 comprises a storage vessel 61, a measuring receptacle 62, and tubular conduits 63 and 64, through which water flows in passing between tank 10 and receptacle 62, and the receptacle and vessel 61, respectively. Conduit 63 extends out of an opening in the wall of enclosure 23, a short distance below main outlet conduit 15. Solenoid operated valves 65 and 66 in conduits 63 and 64, respectively, are actuated by their solenoids to control the flow of a measured sample of water out of tank 10, through receptacle 62, and into vessel 61, at the same time preservative is released into the tank. A tubular extension 67 from the top of receptacle functions as an air vent in the usual manner.

Overflow control unit 80 comprises a float compartment 81 having attached to the outside of its upper rim a normally closed, floated operated switch 82. Unit 80 is maintained in effective position by the structural integrity of emergency outlet conduit 18, which is fixed centrally in the wall of compartment 81 so as to allow water rising to about a mid-level in casing 21 to enter compartment 81. Switch 82 is actuatable to open condition by a float controlled rod 83 connected to a float 84 vertically displaceable in compartment 81 by water rising therein.

Control panel 90 comprises two contact switching electric clocks 91 and 92, a socket 93 receiving connections therein, through leads 94 and 95 from the contacts of float controlled switch 82, which complete a circuit from an A.-C. source 98, through an on-off start switch 96, to the operating coil of a relay 97. Clocks 91 and 92 run continuously by power supplied directly to them from a separate source. Clock 91 is operable to determine the number of sampling periods to occur as desired during a predetermined interval of time. Its clock operated trip pins are preset in a well known manner to close circuits through specified contact pairs associated with the time designations of the clock. An equal number of contact actuating trip pins are preset in clock 92 to effect contact closures of other specified contact pairs associated with the time designations of clock 92, one half hour after each sampling period starts. As will be hereinafter more fully explained, the clock operated contact pairs function to complete circuits which energize the actuating solenoids of the main inlet valve 13, and the valves of preservative unit 40 and water sampling unit 60, as long as relay 97 also remains energized to maintain electrical continuity through contacts thereof in a circuit supplying power to the contact pairs of the clocks.

In the power supply circuit controlled by relay 97, a grounded battery 100 is connected through lead 101 to normally open contacts in the relay and thence through leads 103, 104 and 105 to fixed contacts of the contact pairs of clocks 91 and 92. The complementary contacts of the contact pairs in clock 91 are in electrical connections to leads 107, 108, and 109 through which the energizing circuits for the solenoids of valves 13, 66 and 45, respectively, are accomplished with a return circuit through ground. The complementary contacts of the contact pairs in clock 92 are in electrical connections to leads 111 and 112 through which the energizing circuits for the solenoids of valves 65 and 46, respectively, are accomplished with a return circuit through ground. Also provided for the circuitry of the system is a pilot or system running light 115, indicating an activated condition in relay 97 when on, which is energized from power source 98 in a circuit completed through further normally open contacts of relay 97.

A typical schedule for system operation during an interval lasting a week, includes sampling for a period of one hour out of every six at such times as 10 to 11 a.m., 4 to 5 p.m., 10 to 11 p.m., and 4 to 5 a.m. An exemplary system operating to follow this schedule filters a total water volume of approximately 14,000 liters during the 28 sampling periods of the interval. Operation starts after control panel switch 96 is tripped to one, and when main input valve 13 is opened as scheduled to release water to tank 10. Valve 13 is activated by its solenoid in a circuit completed through contact pairs of clock 91 closed by trip pins preset to function on this clock at the hours of ten and four, and which are held closed by such pins until one hour elapses. Contemporaneously therewith, the closed contact pairs of clock 91 complete operational circuits to the solenoids of valves 45 and 66. As a result, valve 45 opens to permit preservative from vessel 41 to flow in tubular conduit 43 and fill receptacle 42, whose release valve 46 remains closed at that time. Although valve 66 is opened by its solenoid action, no water sample is released to vessel 61 since receptacle 62 is initially empty during the first sampling cycle. Trip pins preset on clock 92 for action on the half hour after eleven, and the half hour after five, thereafter function remaining operative for one hour to close contact pairs in the activation circuits to the solenoids of valves 46 and 65. In this manner, valve 46 is caused to open by its solenoid one-half hour after each sampling period is over and release a measured quantity of preservative from receptacle 42 which flows into tank 10 via tubular conduit 44. At this time valve 65 is also operated to open by its solenoid, and allows water from tank 10, flowing through tubular conduit 63, to fill water sampling receptacle 62 with a portion of the sample then in the tank 10. Since valves 45 and 66 are returned to their normally closed state at the end of the sampling period, receptacle 42 remains empty after discharging into tank 10, and receptacle 62 remains full after the intake thereto from tank 10, until the next sampling period is initiated by the trip pins on clock 91. Receptacles 42 and 62 hold equal volumes of liquid so as to maintain a relatively constant water level during preservation. After the relatively long period of time during which vessel 61 is filled by the regulated inputs of preserved samples thereto from receptacle 62, the contents of this vessel are removed for analysis.

Overflow control unit 80 is operative to prevent loss of samples when screens clog during periods of high phytoplankton density. Continued overflow into compartment 81 raises float 84 sufficiently to cause rod 83 to trip switch 82, and open the power circuit to the operating coil of relay 97. Consequently, all power circuits to the solenoids of the various valves, including main intake valve 13, become ineffective, and remain so conditioned until reactivated manually by draining compartment 81 when the screens are cleared for continued operation. It is also evident that since relay 97, and its operating circuit are deactivated, running light 115 is extinguished when the system becomes clogged. If overflow control unit 80 fails to perform, the overflow in tank 10 will drain through emergency overflow conduit 16. Further, alternative circuitry can be used to insure the release of a final quantity of preservative into tank 10 in the event an overflow due to clogging results in the operation of switch 82 which deactivates the system. In this modification lead 105 is connected directly, or through further normally open contacts of start switch 96, to the ungrounded terminal of battery 100, instead of to contacts on relay 97 via lead 103. Clock 92 is thereby maintained effective to open release valve 46 of preservative receptacle 42, even though switch 82 opens the power circuits to the solenoids of valves 13, 45, and 66. Vent 67 is sufficiently extended above receptacle 62 to avoid overflow therefrom due to the continued operation of valve 65 when valve 66 remains closed.

In the exemplary system heretofore described, the respective screens 27, 28 and 29 are of stainless steel material, and have mesh openings of .0012 inch, .0055 inch, and .0233 inch, which are comparable to standard grade Dufour bolting silk numbers 25, 10 and 00. As was previously indicated, unfastening thumbscrews 36 permit these screens to be removed from under their cover of preservative solution in tank 10, after a run is completed. Each screen will then have accumulated within its pocket different sized organisms. The number 00 screen collects large zooplankton, and any debris that may enter the system, the number 10 screen collects the majority of Copepoda and Cladocera. Rotifers, nauplii, copepodites, and the large phytoplankton are collected in the number 25 screen. The water samples collected in vessel 61 are filtered through a Millipore filter of 0.47µ to obtain its substances of interest.

The present invention is therefore effective to accurately meter the water investigated wherein all sizes of plankton are sampled on a relatively long term continuing basis, and the collections are properly preserved for analysis. In the event the system becomes clogged, due to such conditions as usually high numbers of plankton in the water, it is automatically shut off. It is also evident that the invention allows separate collections of the plankters according to size, whereby it facilitates more rapid analyses.

While a preferred embodiment of the invention has been illustrated and described, it is understood that the invention is not limited thereby, but is susceptible to change in form and detail.

What is claimed is:

1. An automatic apparatus for sampling substances of varied sizes from a stream of fluid comprising a tank, a plurality of screening devices spatially arranged in a superimposed vertical relationship within a lower portion of said tank, means operable in a timed sequence to deliver predetermined samples of the fluid of said stream into said tank above said screening devices, and further means allowing said fluid to discharge from said tank below said screening devices, and an arrangement of mechanisms made operable in a timed relationship in respect to the operation of said means to deliver, to add a predetermined quantity of a further fluid to said tank for conditioning the matter constituting said substances, at the same time a like quantity of fluid is withdrawn from said tank.

2. The automatic sampling apparatus of claim 1, including a further mechanism operationally responsive to the level of fluid in said tank to disable said means operable to deliver samples of stream fluid into said tank.

3. The automatic sampling apparatus of claim 1, wherein said means operable to deliver samples of stream fluid into said tank, and said arranged mechanisms individually comprise solenoid operated valve means, and including a time controlled switch means in operating circuits for said valve solenoids.

4. The automatic sampling apparatus of claim 1 wherein each said arranged mechanism comprises a vessel, a receptacle, and a pair of normally closed, automatically opened valves, and conduit means, having said valves operable therein, connecting said receptacle to said tank and vessel, and a plurality of devices, separately operable at different predetermined times to control individual valves to open and complete a fluid flow passage through said conduit means.

5. The automatic sampling apparatus of claim 4, wherein said valves are opened by the operation of solenoids operatively associated therewith, and said devices comprise clock operated mechanisms and normally open switches disposed in respect thereto so as to be closed thereby for predetermined times, and including a power circuit having said switches as an integral part thereof, becoming effective in accordance with the operation of said clock operated mechanisms to selectively energize said solenoids.

6. The automatic sampling apparatus of claim 1 wherein said substances are plankton, and said stream fluid is water, and said mechanisms of said arrangement include a first vessel containing a preservative fluid to aid storage of said plankton in said tank, a first receptale, and tubular conduits providing first and second passages between said first receptacle and said vessel and tank, respectively, a second vessel adapted to receive water from below said screening devices in said tank, a second receptacle, and further tubular conduits providing third and fourth fluid passages between said second receptacle and said tank and said second vessel, respectively, a normally closed solenoid operated valve in each said tubular conduit fluid passage and said means operable to deliver samples of stream water into said tank, an electrical power circuit for activating said solenoids to open said valves, normally open clock controlled electrical switch contacts in said power circuit which when selectively closed by said clock control function to complete said power circuit to selectively operate said solenoids in said means operable to deliver samples of stream water into said tank and in said first and fourth tubular conduits, and at a predetermined time thereafter the solenoids in said second and third tubular conduits, whereby sampling of the water from the stream is accompanied by flowing a predetermined quantity of preservative fluid from said first vessel to said first receptacle, and a measured quantity of screened water in said second receptacle into said second vessel, and subsequently flowing the quantity of preservative fluid stored in said first receptacle to said tank at the same time that an equal quantity of water is supplied from said tank to fill said second receptacle.

7. The automatic sampling apparatus of claim 1, wherein each of said screening devices comprises a conical screening surface depending from a circular rim thereof to converge to a point, the rim to point distances of the screens being progressively greater for the underlying screens in said superimposed relationship, a removable plug screwed into an opening in the converging point of each screen, and said screens being maintained in operative position by removable fastening and sealing means securing the rims of the screens to the inner wall of said tank.

References Cited by the Examiner

UNITED STATES PATENTS

| | | | |
|---|---|---|---|
| 2,474,145 | 6/1949 | Gambill | 210—138 X |
| 2,720,047 | 10/1955 | Isaacs. | |
| 2,999,514 | 9/1961 | Kryzer | 210—138 |
| 3,203,253 | 8/1965 | Scheid | 73—61 |

LOUIS R. PRINCE, *Primary Examiner.*

D. M. YASICH, *Assistant Examiner.*